United States Patent [19]

Buell

[11] Patent Number: 5,577,790
[45] Date of Patent: Nov. 26, 1996

[54] SHOCK ABSORBING SEAT MOUNT

[76] Inventor: William S. Buell, 27703 Ortega #15, San Juan Capistrano, Calif. 92675

[21] Appl. No.: 305,779

[22] Filed: Sep. 14, 1994

[51] Int. Cl.⁶ .................................................. B60N 2/50
[52] U.S. Cl. ........................ 296/63; 267/132; 280/283; 280/287
[58] Field of Search ........................ 296/63; 297/209, 297/211, 302.4, 337, 344.11, 344.1, 195.1; 280/220, 283, 287; 267/132

[56] References Cited

U.S. PATENT DOCUMENTS

| | | | |
|---|---|---|---|
| 1,120,379 | 12/1914 | Epley | 297/209 |
| 1,153,817 | 9/1915 | Oliver | 267/132 |
| 1,453,326 | 5/1923 | Sentrop | 297/211 |
| 2,570,970 | 10/1951 | Murray | 297/209 |
| 2,639,760 | 5/1953 | Szilagyi | 297/209 |
| 4,456,295 | 6/1984 | Francu | 297/209 |

FOREIGN PATENT DOCUMENTS

| 518539 | 4/1953 | Belgium | 297/337 |
|---|---|---|---|

Primary Examiner—Gary C. Hoge

[57] ABSTRACT

A suspended, gravity centering, shock absorbing seat mount includes a pair of elongated mounting brackets (2) for attaching the seat mount to a vehicle. An upper pivot shaft (5) extends laterally between the mounting brackets. A shackle (3) is mounted at an upper end thereof to each opposite end of the upper pivot shaft (5). A lower pivot shaft (7) is mounted to a lower end of each shackle, and extends laterally outwardly therefrom. A casing (14) is mounted at a bottom end thereof to each of the lower pivot shafts, and a seat mounting member (15) extends laterally between upper ends of the casings. The shackles are free to move in an arc about the upper pivot shaft, and the casings are free to move in an arc about the lower pivot shafts, thus allowing the seat mounting member to move forwardly and rearwardly in response to forward and rearward motion of the vehicle, and returning the seat mounting member to a central position by gravity.

2 Claims, 4 Drawing Sheets

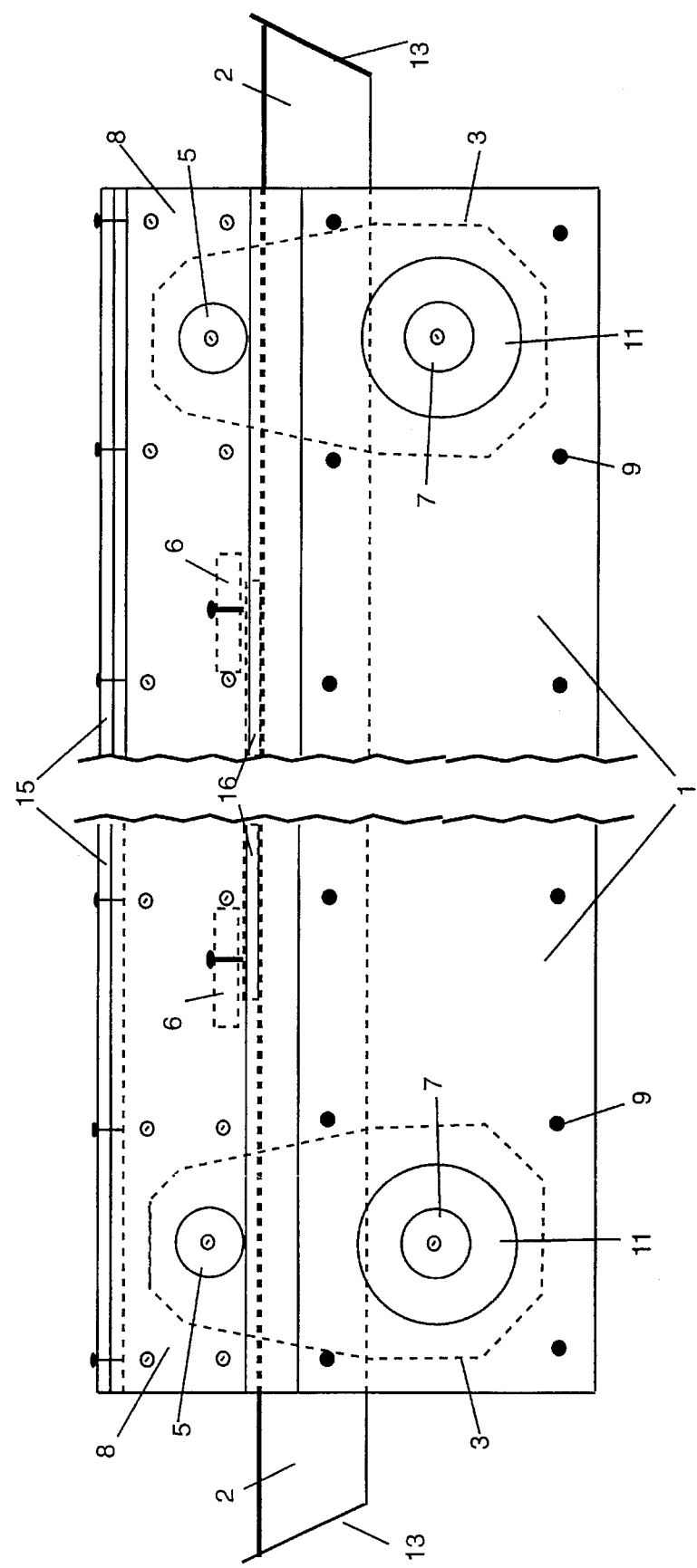

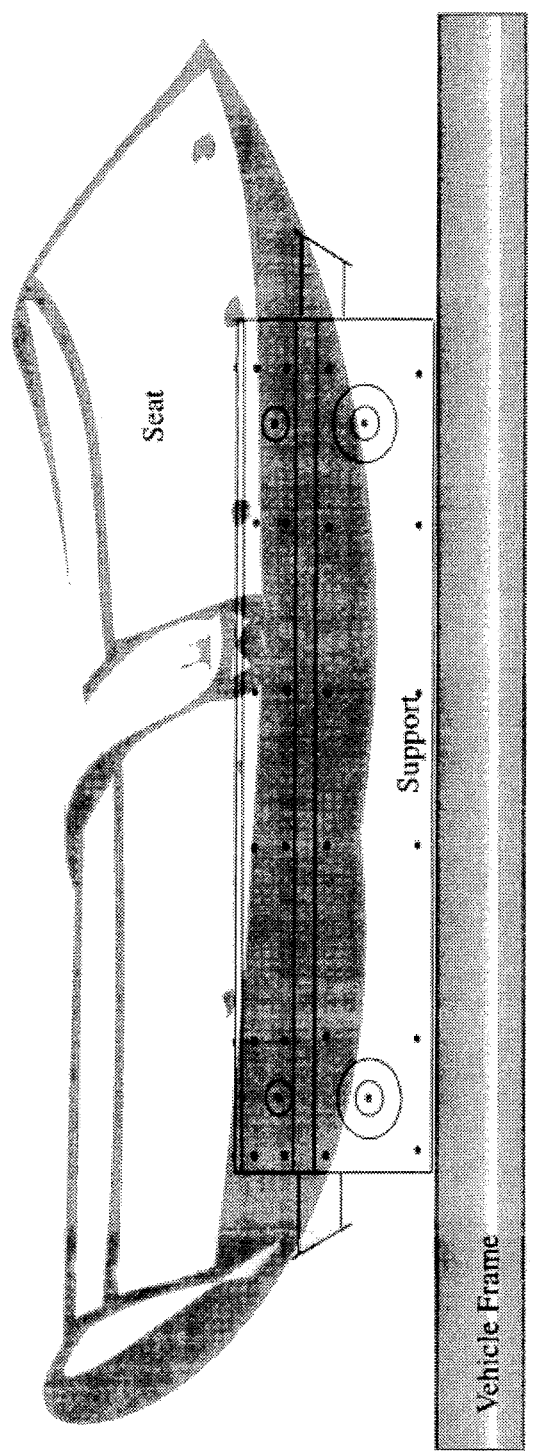
Figure No. 1B

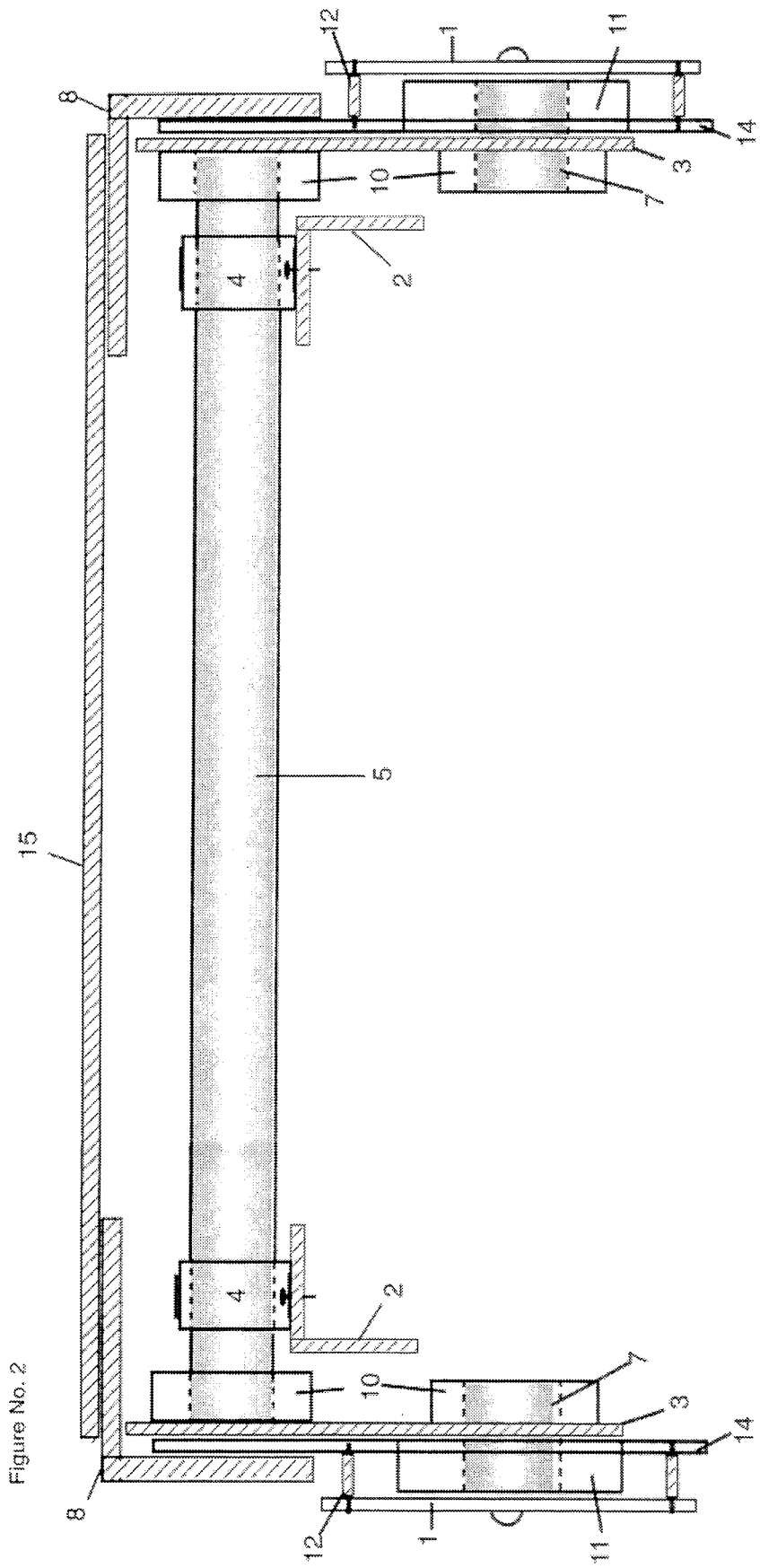

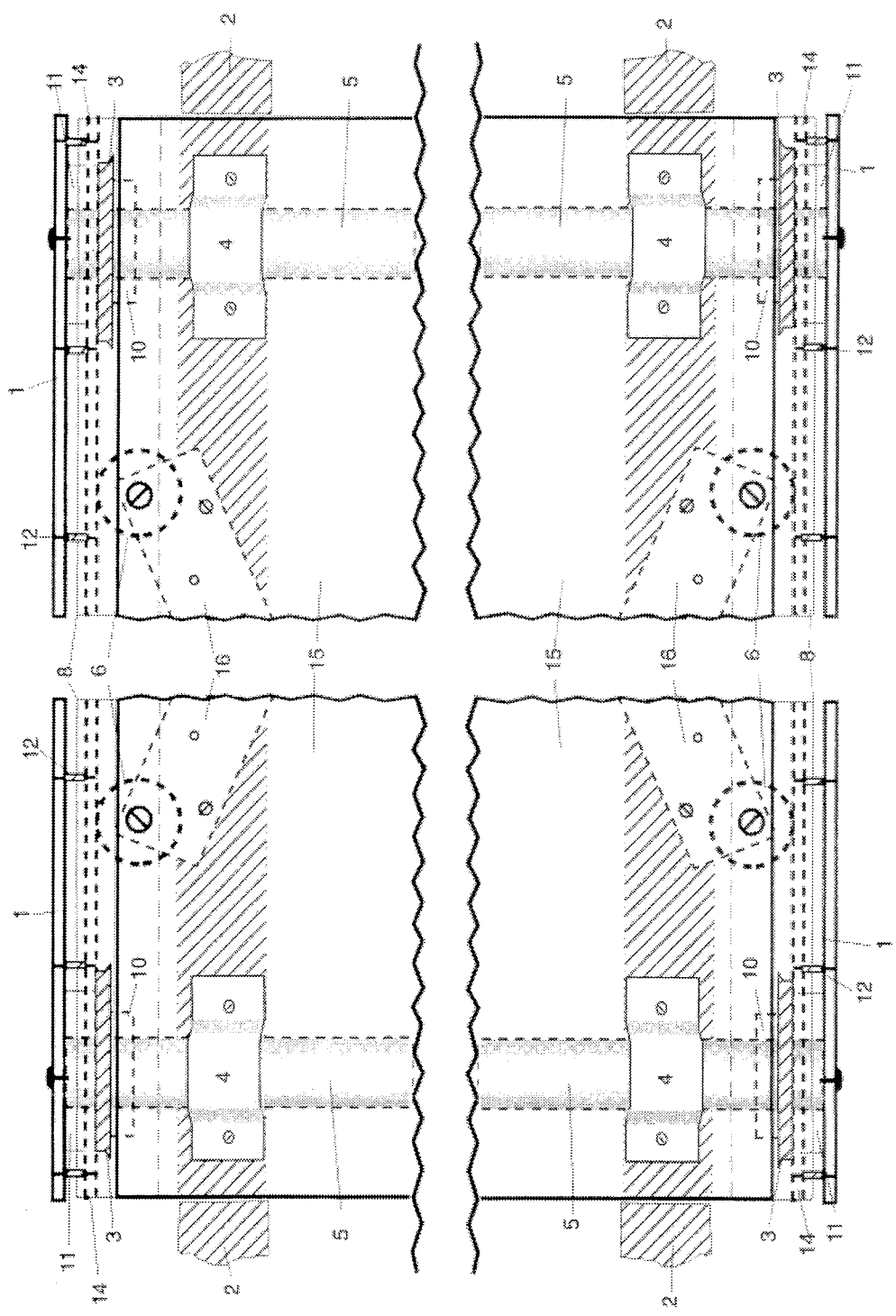
Figure No. 3

SHOCK ABSORBING SEAT MOUNT

BACKGROUND OF THE INVENTION

1. Field of the Invention

This invention would come under Class 267, Subclass 132 as a seat support for vehicles, bicycles, or vessels. The device is a buffer between the seat of the vehicle/vessel and the frame. It cushions the rider/driver by providing a stable base for the seat as the frame is jarred by the bumps and dips in the road/water/snow and it transfers horizontal motion to the traditional vertical motion provided for by foam or springs in the vehicle/vessel seat. It is a mechanical device that can be adapted to any vehicle that has a seat and a frame by fastening it between that existing seat and frame.

2. Description of the Prior Art

Earlier art has included devices which rely on the use of springs or various other means to give the cushioning up and down motion and a few devices which give some backward and forward motion but none previously which furnish an arc-caused rise on either end of the forward and back motion or which provide the smoothness of the motion in this support or its gravity centered return and sling like effect. This slight rise at the end of the arc causes the rider/driver to feel very secure on the seat and be almost unaware of the forward and backward motion of the vehicle/vessel because the support allows the seat to remain more stable. Specific prior art which had some elements in common but also important differences include the following:

U.S. Pat. No. 4,456,295 by Francu

With this invention, on a horizontal plane, there is no tolerance for motion fore and aft. The springs help only on a vertical plane. On my invention, the support provides fore and aft cushioning and the springs are separate (not a part of the invention but part of the existing seat only). It is gravity that returns the seat to the center (neutral) position after its fore and aft motion rather than a spring.

U.S. Pat. No. 1,120,379 by Epley

The seat on this one is bolted indirectly to the frame, thus it provides no relief from the horizontal shock except through the spring which actually transfers shock to the rider rather than away from him/her. My invention does not depend on springs to cushion the shock. My invention uses gravity. bearings, and a short arc rather than springs. Mine also provides a slight upward motion at the ends of each forward and back motion which gives a feeling of stability to the driver/rider because of its sling-like effect.

U.S. Pat. No. 1,453,326 by Senttop

This invention definitely uses springs for horizontal shock and my invention does not use springs. The spring transfers shock to the rider rather than away from him/her. Springs do not provide the smoothness and feeling of stability that my invention provides by using gravity, bearings, and a short span of the arc to cushion the horizontal shock.

U.S. Pat. No. 518,539 by Breau

This invention uses brackets/shackles as supports for the seat whereby the frame of the vehicle is attached to the lower pivot point of the bracket and the seat is attached to the upper pivot point of the bracket and a spring is used to hold the bracket up straight. Because of this the seat will fall to the front or back and does not use gravity to return to the center position. On my invention, the seat is attached to the lower rather than upper pivot point and the frame is attached to the upper rather than lower one so that the center of the arc is in a neutral area and no springs are needed to hold it in the there. On my invention, the seat is stable and gravity returns it to the center point. This seat has an arc that is the reverse of the one on my seat and thus doesn't give the rider/driver the same feeling of stability of the seat.

U.S. Pat. No. 2,639,760 by Szilagyi

This support has no accommodation for fore and aft shock of the frame. The value of my invention is based on its accommodation to and relief of fore and aft shock of the vehicle/vessel.

SUMMARY

At first, one might think that the fore and aft compensated motion would give the rider an uneasy feeling, but quite the contrary is true. When braking, the seat moves forward and lifts slightly as it goes forward giving the rider a more secure feeling. In starting off, the seat goes backward and lifts slightly. After riding for a short time, one hardly notices that motion, but is very aware that he/she doesn't feel the jar from the road or the vibrations from the engine. The seat actually moves very little fore and aft and not at all sideways but instead allows the frame to move without causing motion in the seat. Thus it is very easy to ride all day long and feel no ill effects from riding. Additionally the seat support can be installed either side up so that a difference in the height of the seat can be created.

This shock absorbing seat mount is unique in that it offers drivers/riders of all vehicles having two or more wheels or vessels a truly comfortable ride. While the springs or foam of most seats cushion the usual up-and-down jolts of the road, this seat support also offers the slight forward and back arc that cushions shocks far more effectively than any earlier seat support has ever done.

Circumstances of Conception

In July of 1986, I bought a 1983 CX 650 Custom Honda Motorcycle to drive to work and back. It was a 50-mile round trip each day. It didn't take long for me to realize that I would have to do something to save my kidneys and lower back from the discomfort caused by the rough ride.

On a motorcycle, between the wheels and seat, a triangle forms. When the front wheel goes over a bump, the force of the jar moves the seat to the rear. When the rear wheel goes over the bump, the force moves the seat forward. Engine vibration is many times fore and aft. There are no seat supports that compensate for this shock by having a fore and aft motion coupled with a slight rise on either end of the motion. Without the rise, the rider can feel unstable and the support won't reduce the strain put on the driver/rider. With my device, which does compensate for this shock, the driver/rider will hardly notice the vibration fore and aft and will experience a great increase in comfort because of this. I had tried many different seats and vehicles but no amount of padding made this fore and back jostling less stressful. When riding on this seat support, the rider actually feels less motion because, as the vehicle goes forward and back, his/her body is able to remain almost motionless while the support absorbs the shock. The need for a support like this one is there in any vehicle that has a short wheel base, stiff suspension for heavy loads, and two or more wheels or which rides or glides on a rough jarring surface as is the case with wave runners and snow mobiles as well as many boats.

I tried a number of different solutions in the last eight years, finally coming up with what seems to be the perfect solution in January of 1994. I have built a prototype of the support and am currently using it on my new motorcycle, a 1993 Suzuki Intruder. I have test driven it on trips of over 500 miles for a total of 27,000 miles and have found it to be a vast improvement as far as comfort, stability, and handling are concerned. I have also tested it on other types of vehicles and vessels and found it to be equally helpful on them.

Purpose or Problem Solved

The purpose of the seat support I have designed is to protect the rider's comfort by reducing the jolting and vibration to the kidneys and back for people who ride on motorcycles or other vehicles with short wheel bases and stiff suspension or on vessels with a jarring ride. This is particularly valuable for people who ride all day (like motorcycle policeman or truck drivers) or for the older rider/driver, but it would be appreciated by anyone. Road and engine vibration are very tiring and uncomfortable, especially on a long trip so eliminating a large portion of the jolting makes any trip more pleasurable and less tiring.

Conclusion

The principle of this shock absorbing seat mount can be applied to any vehicle with two or more wheels in order to reduce shocks from the road and engine vibration. This includes, but is not limited to, bicycles, motorcycles, small and large or semi-trucks, cars, jeeps, wagons, all-terrain vehicles, military vehicles, tractors, and off-road vehicles of all kinds. It also includes vehicles/vessels without wheels that are subject to jolting like snowmobiles, boats, and jet skis.

The proportions of the design would vary based on the type and size of the vehicle or vessel but the basic principle and structure would remain the same.

DESCRIPTION OF THE DRAWING FIGURES

FIG. 1, 2 and 3 are different views of a support for a seat that converts horizontal shock to a much reduced vertical motion.

FIG. 1A—side view

The outer casing (consisting of the ball bearings, outer, inner, and top cut, drilled and tapped plate stock, nylon spacers, and large angle iron) is transparent showing the four pivot points that occur at the axis of the shafts and the inner casing (consisting of small angle irons with bearings) with corresponding bearings that is supported by the frame. The outer casing moves horizontally in an arc-like manner independent of the inner casing.

FIG. 1B—Overview

Shows how the seat support fits between the frame and the seat of a vehicle.

FIG. 2—Rear View

Shows the device from the open-ended rear view and exposes the position of the shackles and bearings in relation to the long and short shafts and the large angle irons which provide mounting support for the seat of the vehicle and the small angle irons that provide support for mounting to the frame.

FIG. 3—Top View

Shows how the pivot points exist in all four corners on this drawing.

DESCRIPTION OF THE PREFERRED EMBODIMENTS

The invention resides in the provision of a suspended, 180-degree shock absorbing seat support that fits between the seat of any vehicle or vessel and the frame of that vehicle/vessel. This device is comprised of a pair of interacting open ended casings. The outer casing consists of an outer cut, drilled, and tapped plate stock (1) spacers (12) located at points (a), inner cut, drilled, and tapped plate stock (14) reinforced by large angle irons (8) with a top cut, drilled, and tapped plate stock (15) to tie the large angle irons (8) together, and the inner casing consists of small angle irons (2) has been inserted after irons (2). These casings are horizontally movable in an arc pattern to one another in both directions with little or no resistance. They return to the center position by gravity so any subsequent fore-and-aft shock can then be handled quickly. Hence, it provides the rider/driver with stability independent of the frame of the vehicle.

The inside casing has corresponding bearings (4) that receive the long steel shafts (5) that are affixed to the shackles (3) on either end by retainers (10).

The upper pivot point is created by a long steel shaft (5) that is mounted in self centering bearings (4) that rest on small angle irons (2). These small angle irons can be connected to the frame of the vehicle.

The lower pivot point is created by a short steel shaft (7) that is affixed to the shackle (3) and extends on through the bearing (11) in the inner cut, drilled, and tapped plate stock (14) that attaches to large angle irons (8) connected to top cut, drilled, and tapped plate stock (15) that supports the seat of the vehicle.

There are two pivot points on each shackle (3) that allow the shackles (3) to swing in a horizontal arc. The sequence of action is duplicated on each supporting position. Thus the outer casing comes to the center position governed by the gravity of the seat and rider/driver thereby allowing the next horizontal shock (as caused by bumps or dips in the path of the vehicle) to occur without jarring the driver/rider because of the sling-like effect of the seat support. Two brackets (16) are mounted to each angle iron (2). A nylon roller (6) is mounted at a distal end of each bracket. The nylon rollers engage plate stock (14) in order to stabilize side-to-side motion of the outer casing.

The seat support transfers horizontal shock to a very reduced vertical motion which is then absorbed by the traditional springs or foam of the vehicle's/vessel's existing seat. The support itself does not need to contain springs or foam because it works in conjunction with the existing vehicle/vessel seat. Because the existing seats are good at cushioning vertical shock but do not cushion horizontal shock, this support benefits the rider/driver by changing the horizontal shock to vertical motion. That is what is inventive and unique about this support.

What is claimed is:

1. A suspended, gravity centering, shock absorbing seat mount comprising:

a pair of elongated mounting brackets (2) for attaching the seat mount to a vehicle;

an upper pivot shaft (5) extending laterally between and being pivotally mounted to said mounting brackets;

first and second shackles (3) mounted at an upper end thereof to respective opposite ends of said upper pivot shaft (5);

first and second lower pivot shafts (7) mounted to lower ends of said first and second shackles, respectively, and extending laterally outwardly therefrom;

first and second casings (14) mounted at a bottom end thereof to said first and second lower pivot shafts, respectively; and a seat mounting member (15) for supporting a seat, said seat mounting member extending laterally between and being mounted to upper ends of said first and second casings, wherein said seat mounting member is spaced from and above said upper pivot shaft, whereby said first and second shackles are free to move in an arc about said upper pivot shaft, and said first and second casings are free to move in an arc about said first and second lower pivot shafts, respectively, thus allowing said seat mounting member to move forwardly and rearwardly in response to forward and rearward motion of the vehicle, and returning said seat mounting member to a central position by gravity.

2. The seat mount of claim 1, including at least one stabilizer bracket (16) mounted to each mounting bracket (2), and a roller (6) mounted to said at least one stabilizer bracket, said roller engaging one of said first and second casings (14) to thereby stabilize lateral motion of the casings.

* * * * *